United States Patent Office 3,549,472
Patented Dec. 22, 1970

3,549,472
CORK AND FOAM PRODUCT
Robert E. King, Georgetown, Mass., and Ben V. Dardig, New York, N.Y., assignors to Cushioned Products Corporation, Boston, Mass., a corporation of New Hampshire
No Drawing. Continuation-in-part of application Ser. No. 605,985, Dec. 30, 1966, which is a continuation-in-part of application Ser. No. 524,819, Feb. 3, 1966. This application Nov. 22, 1968, Ser. No. 778,326
Int. Cl. B27k 7/00; C08g 22/44, 51/20
U.S. Cl. 161—87                7 Claims

ABSTRACT OF THE DISCLOSURE

Cork particles, resilient foam particles and a polyurethane resin are combined in a new composition. The mixture of the cork and foam particles with a liquid resin initially provides a free-flowing material which is easily handled without agglomeration. The mixture, when molded by the application of heat and pressure, produces a light weight, resilient, porous substance having a wide variety of uses such as inner soles for shoes and the like.

---

This application is a continuation-in-part of copending application Ser. No. 605,985, filed Dec. 30, 1966 (now abandoned) and which is a continuation-in-part of Ser. No. 524,819, filed Feb. 3, 1966, (now abandoned) and assigned to the same assignee as this application.

This invention relates to a novel composition of matter comprising cork particles, resilient foam particles and a polyurethane resin, to processes for making such composition, articles comprising such compositions, and to processes for making said articles.

Heretofore, cork has been employed with viscous binders to produce two different types of products; one where the cork content is no greater than the weight of the binder and, the second type, where the cork content exceeds the weight of the resinous binder. In the first type, the resulting product exhibits the properties of the resin, particularly with respect to resiliency and the cork primarily functions to lower the density of the resulting product, except, however, when used with poly(vinyl chloride) resin, the art teaches that it improves the resins' shrinkage or expansion characteristics. In the second case, the properties of cork predominate over the resin, particularly when the resin weight is less than one half (½) the weight of cork. These products are generally highly agglomerated and very tacky, therefore difficult to handle. The above products can be molded in various shapes to produce articles of interest. However, such products typically are deficient in resiliency and are often stiff and fail to take bending without cracking.

This invention is concerned with the manufacture of a free-flowing intimate mixture of particles of cork and resilient foam which is impregnated with a liquid polyurethane resin. These impregnated particles are substantially tack-free, i.e., they can be swirled about in a glass container for at least 2 minutes at room temperature (i.e., 20° C. to 25° C.) and poured out of the container with less than 2 weight percent of the particles sticking to the container walls. In addition, the impregnated cork and foam particles of this invention are essentially free of agglomerates, i.e., less than 2 weight percent of the particles contain more than 2 agglomerated particles and less than 25 weight percent of the particles contain agglomeration of any type. In the most desirable embodiment of this invention, the particles are free of agglomerates.

"Agglomeration" or "agglomerates," as employed herein and in the claims, means the adhesion of at least two resin impregnated cork and/or foam particles which cannot be separated to the individual particles by grinding between ones fingers. If more strenuous means than simple rubbing of the joined particles between one's fingers is required to separate them, then the joined particles are considered in accordance with this invention to be agglomerates or agglomerated, and hence, in a state of agglomeration.

Another feature of the liquid polyurethane resin impregnated cork and foam particles of this invention is that they possess essentially the same bulking characteristics as the cork and foam particles prior to polyurethane resin impregnation. Thus the impregnated cork and foam particles possess a bulking characteristic not more than 10 percent greater than the bulk characteristics of the mixture of cork and foam particles prior to impregnation.

A further feature of the impregnated cork and foam particles of this invention is that their weight typically does not substantially exceed two times the weight of the cork and foam particles mixture prior to impregnation, generally not greater than ¾ (three-quarters) more than the weight of the nonimpregnated cork and foam particle mixture.

The liquid polyurethane resin impregnated particle mixture of this invention is typically essentially free on visual inspection of liquid resin on its surface, clearly indicating that the resin content is adsorbed on the particle surfaces and adsorbed internally in the particles within their many interstices and hollows.

Because of the above features, the polyurethane resin impregnated cork and foam particles are easily handled. They can be poured like finely ground sand into molds and compressed with heat into many useful articles. Because the particles are essentially tack-free and free of agglomerates, molded articles can be produced which are extremely uniform and essentially, and preferably, free of large voids. Moreover, because the liquid polyurethane resin is provided within the particles, the resulting molded articles possesses essentially the resiliency and buoyancy of the cork and foam, even though the molded and compressed particles are tightly bonded together by the resin.

The cork useful in the practice of this invention may be of any of the conventionally used varieties. However, it is preferable that the cork particles possess a particle size capable of passing through a 2.5 mesh screen, U.S. Sieve Series standard, and be retained by a 325 mesh screen, U.S. Sieve Series standard. Most desirably, the particle size should be between 5 mesh to 140 mesh. As can be noted from the above, the cork particle size is not narrowly critical though best results are obtained when the average particle size is fairly uniform, e.g., falling within a 150-micron spread.

The resilient foam particles useable in the practice of this invention may be any foam which can be compressed to ½ its thickness without application of heat and rebounds to essentially its orginal thickness when pressure of compression is relieved. Particularly suitable foams are open cell polyurethane and poly(vinyl chloride) foam, especially flexible and semirigid polyurethane and poly(vinyl chloride) foam. The resilient foam particle employed herein has an average particle size typically not greater than 50 times that of the average particle size of the cork, preferably not greater than 30 times that of the average particle size of the cork. In the usual case, the average particle size of the foam is at least above the average particle size of the cork. The amount of foam particles employed typically ranges from about 5 percent to about 150 percent, or more, based on the weight of cork particles employed, usually from about 10 percent to about 100 percent of the weight of the cork particles employed.

The impregnant is a liquid polyurethane elastomer or potential elastomer and as defined herein and in the claims, includes as solution of resinous and elastomeric polyurethanes in a solvent, as well as prepolymers which can be converted to the desired polyurethane. Such polyurethanes are formed by the reaction of an organic polyisocyanate and active hydrogen containing organic compounds as determined by the Zerewittinoff Method, Journal of the American Chemical Society, volume 49, page 3181 (1927).

Organic polyisocyanates useable in forming the polyurethane resin include, by way of example, the following: 2,4-toluene diisocyanate, 2,6-toluene diisocyanate, mixtures of the foregoing, m-phenylene diisocyanate, p-phenylene diisocyanate, bis(4-isocyanatophenyl)methane, 2,2 - bis(4-isocyanatophenyl)propane, 1,6-hexamethylene-diisocyanate, 1,4-tetramethylene-diisocyanate, 4-4-methylenedi - ortho-tolylisocyanate, 2,4,4'-triisocyanatodiphenylether, toluene - 2,3,6 - triisocyanate, 1-methoxy-2,4,6-benzeneteiisocyanate, 4-chloro-m-phenylenediisocyanate, 4,4-biphenyldiisocyanate, 1,5-naphthalenediisocyanate, 1,4-cyclohexanediisocyanate, stilbene diisocyanates dixylylmethane diisocynanates, and the like. A significant list of suitable polyisocyanates useable herein is described by Siefken Annalen, 562 pages 122 to 135 (1949).

Active hydrogen containing organic compounds which may be reacted with the organic polyisocyanates include, by way of example, water, ammonia, amines, alcohols, phenolics, mercaptans and the like. To form the desired polyurethanes, at least a portion of the polymeric molecule should be the reaction product of an isocyanate group and a hydroxyl group such as derived from alcohols and phenolics. By the term "phenolic(s)," it is meant herein and in the claims, an aromatic radical directly bonded to a hydroxyl group, viz,

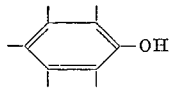

Thus an organic polyisocyanate can be reacted with alcoholic or phenolic hydroxyl groups which, in turn, are derived from or part of organic compounds, such as 1,4-dihydroxybenzene, catechol, pyrogallol, ethylene glycol, trimethylene glycol, 1,4-tetramethylene clycol, 1,2-propylene glycol, 1,5-pentamethylene glycol, 1,6-hexamethylene glycol, 1,2-butylene glycol, 1,2-pentamethylene glycol, 1,2-hexamethylene glycol, 1,2-octamethylene glycol, 2,2-bis-(4 - hydroxyphenyl)propane, bis(4 - hydroxyphenyl)-methane, 1,2,6-hexane triol, diethylene glycol, 1,2-dipropylene glycol, di(1,4-butylene)glycol, di(1,2-butylene)-glycol, tri- and tetraethylene glycol, tri- and tetra 1,2-propylene glycol, tri- and tetra-1,4-butylene glycol, sucrose, cellulose, glucose, glycerol, pentaerythritol, and the like.

In addition, other most suitable hydroxy organic compounds include polyalkylene oxide diols such as poly-(ethyleneoxide)diol, poly(1,2-propylene oxide)diol, poly-(1,4-butyleneoxide)diol and the like, having molecular weights in the range of from about 400 to 10,000, preferably from about 700 to 5,000.

Other useable hydroxy organic compounds include the alkylene oxide adduct of active hydrogen containing compounds such as organic polyols and amines. These adducts are formed by the reaction of monomeric oxirane alkylene oxides with the polyols and/or amines in the presence of an alkaline catalyst such as sodium and potassium hydroxides, ammonium hydroxide, tetramethylquaternary ammonium hydroxide, and the like. Illustrative alkylene oxides useable for adduct formation include ethylene oxide, 1,2-propylene oxide, 1,2-butylene oxide, 1,2-pentylene oxide, 1,2-hexylene oxide, styrene oxide, and the like. Each adduct may contain from 1 to 100 or more of alkylene oxide units. Suitable organic polyols are encompassed by the hydroxy organic compounds described above. Useable amines for adduct formation include monoamines and polyamines such as ammonia, hydrazine, N.N'-dimethyl hydrazine, urea, melamine, ethylene diamine, aniline, diethylene triamine, piperazine, methylamine, and the like. The above adducts may have molecular weights ranging from about 100 to about 5,000, and greater.

Another class of active hydrogen containing compounds which may also be classed as hydroxy organic compounds are the hydroxy-terminated organic polyesters. These polyesters may be formed from the interreaction of organic polyols, such as described above, and organic polycarboxylic acid, or their esters and acid halides. By employing a molar excess of polyol over carboxylic acid, there is obtained a hydroxy-terminated polyester. The amount of molar excess will determine the molecular weight of the polyester. Instead of reacting carboxylic acids with the polyol, one may employ instead an organolactone, such as caprolactone. The hydroxy group of the lactone serves as the chain terminator and, therefore, a molar excess of lactone is employed.

Illustrative of the polycarboxylic acids employable include, by way of example, oxalic acid, malonic acid, succinic acid, glutaric acid, adipic acid, pimelic acid, suberic acid, azelaic acid, sebacic acid, alkylsuccinic acids, maleic acid, fumaric acid, itaconic acid, itraconic acid, muconic acid, 1,2- and 1,4-cyclohexanedicarboxylic acid, phthalic acid, isophthalic acid, tetephthalic acid, tetrahydroterephthalic acid, tetrachlorophthalic acid, 1,5-naphthelenedicarboxylic acid, 1,1,5 - pentanetricarboxylic acid, 1,2,4-hexanetricarboxylic acid, 1,2,3-propanetricarboxylic acid, 1,2,4-benzenetricarboxylic acid, and the like.

Such polyesters desirably possess a molecular weight of from about 500 to about 10,000, or more. Preferably, the polyester has a molecular weight between about 700 and about 5,000.

The polyurethanes may be prepared in many ways. For example, a hydroxy containing compound and a polyisocyanate can be reacted to form a prepolymer containing free isocyanate groups. This prepolymer can then be reacted with any active hydrogen compound, such as water, amines, alcohols or phenols, mercaptans, and the like, to form the final polyurethane. The active hydrogen compounds which are reacted with the prepolymer are termed herein to be chain-extenders. They function to react with the free isocyanate and link prepolymer molecules together to form the ultimate polymer.

Another technique of preparing the polyurethane involves forming a mixture of the hydroxy containing compound and the polyisocyanate, with or without a chain-extender. The mixture is heated to reaction temperature in the presence of conventional catalysts, such as tertiary amine, stannous octoate, dibutyltin dilaurate, and the like.

Particularly suitable chain-extenders include water, the above-mentioned hydroxy organic compounds, e.g., ethylene glycol, glycerol, 1,2-propylene glycol, 1,4-butane diol, etc., and polyamines such as hydrazine, ethylene diamine, 1,4-butylene diamine, 1,6-hexamethylene diamine, N-methyl-bis(2-aminoethyl)amine, and the like.

The above reactions and conditions employable are well known in the art and form no part of this invention.

In practice of this invention, the prepolymer technique is preferred. However, regardless of the technique employed, the polyurethane and polyurethane forming reactants should be in liquid state when mixed with the cork and foam particles. Thus the polyurethane resin or reactants employed in making the resin should be either liquid or dissolved in a solvent when mixed with the cork and foam particles. If a solvent is employed to dissolve the reactants, then it is evaporated from the impregnated cork and foam prior to use thereof. If a chain-extender, such as water, is employed which is insoluble in the solvent, then the chain-extender may be admixed and absorbed in the cork and foam particles after the solvent is evaporated.

Since cork is cellulosic and possesses hydroxyl groups, it is capable of reaction with isocyanates or hydrogen-bonding with polyurethane resins. Thus, it is believed that the cork enters into reaction with the polyurethane resin by covalent bonding and/or hydrogen bonding. This is believed to be the reason why the heat-compressed impregnated cork particles admirably bond to each other and the foam to form unique molded articles. When polyurethane foam is employed as one of the particles, it also may react by virtue of its active hydrogen with the polyurethane resin when the resin contains unreacted isocyanate. Thus, the polyurethane foam particles are preferred in the practice of this invention.

The cork and foam particles are impregnated with the liquid polyurethane resin with or without chain-extender by dispersing the liquid into the cork and foam until essentially all of the liquid is absorbed by the particles. Almost any mixing procedure may be employed. The liquid may be poured into a container containing the particles and mixing with any type of mixing device is continued until the desired amount of liquid is absorbed by the partcles. If the polyurethane contains solvent, then the solvent is evaporated at relatively low temperature to minimize undesirable reaction and dissolution of the foam particles. Highly volatile solvents are desirable to preclude premature reaction. Illustrative solvents include, e.g., acetone, methyl ethyl ketone, methyl isopropyl ketone, methyl isobutyl ketone, ethyl acetate, methyl acetate, isopropyl acetate N,N-dimethylformamide, N,N-dimethylacetamide, chloroform, methylchloroform, diethyl ether, and the like. Preferably, evaporation is conducted at reduced pressures serving to lower the effective temperature of evaporation.

The amount of resin by weight admixed and impregnated within the mixture of cork and foam particles is preferably not greatly in excess of the weight of the particles, and most desirably, the liquid mix is equal to the weight of the dry particles. If a solvent is employed, any amount may be employed without adversely affecting absorbtion of the resin. However, it is desirable to admix and impregnate the particles with at least 5 weight percent of the resin, based on the weight of the particles, and most preferably, at least 15 weight percent of the resin.

To make the bonded and compressed cork and foam particles of this invention, the resin impregnated particles may be placed into a mold of the desired shape and with pressure and heat, typically applied through the mold, the particles are compressed and bonded to the mold's configuration. The time and temperature of molding is dependent upon the polyurethane resin impregnant employed, the cork and foam particles size, the degree of compression and the like factors.

In the usual case, the temperature during molding is at least about 35° C. up to about 300° C., and preferably, at least about 50° C. up to about 200° C. The residence time during molding is generally greater than about 10 seconds up to about 10 minutes, preferably greater than about 30 seconds up to about 5 minutes. In the typical case, the higher the temperature employed, the lower the residence time needed to make the desired product.

One preferred embodiment of this invention involves the use of a polyurethane prepolymer (as the liquid impregnant) possessing free isocyanate groups and incorporating this prepolymer with water in amounts of from about 0.5 to about 200 weight percent, based on the weight of the prepolymer, in admixture with the cork and foam particles and a polyol chain-extender (e.g., ethylene glycol and glycerine) in an amount of from about 0.5 to about 200 weight percent of the prepolymer. Both the prepolymer and water are absorbed by the particles to form the desirable free-flowing impregnated particles of this invention. The particles may then be placed in a mold and heat-compressed to form a highly resilient, flexible cork and foam article which does not suffer from age hardening.

The foam particles can be produced by any of the known techniques. For example, the polyurethane foam may be derived from polyethers or polyesters, polyisocyanate with or without chain-extender. The chemistry above referred to regarding polyurethane resin is equally pertinent for foam formation except that surfactants (e.g., siliconeoxyalkylene block copolymers) and blowing agents are desirably employed. In the usual case, waste foam is employed in the practice of this invention thereby significantly reducing the cost of the novel compositions and articles described herein. The waste foam is shreadded, cut or ground to the desired particle size.

The only significant property of the foam employed in this invention is its resiliency as above defined and if the foam satisfies this condition, it is suitably employable.

The impregnated cork and foam particles of this invention can be molded into many useful articles employing simple molding techniques. Typical molded articles include shoe innersoles, shoe outsoles, brassiere cups, acoustical paneling, stair treads, automobile headliners, automobile dash and/or crash panels, gaskets and seals, wall paneling, carpet underlay, floor tile, seat cushions, cold and hot temperature insulation panels, filters, liquid flotation equipment (life jackets, fishing bobs, etc.) and the like. Because of the presence of foam particles, these articles possess remarkable resiliency and flexibility greatly exceeding prior art resin bonded cork articles. The manufacture of such products is relatively simple. The desired amount of polyurethane resin-impregnated cork and foam particles is poured uniformly in a mold cavity of the desired shape. Preferably, the walls of the cavity extend higher than the mold volume in which shaping takes place because the amount of impregnated cork and foam placed in the mold desirably is sufficient to more than fill up such volume. Then a ram (male member) is forced into the cavity with sufficient force to compress the particles into the shaping volume. Since both the mold cavity and the ram are preheated or heated during compression, bonding of the particles occurs and, on removal of the article from the mold, there is obtained a permanently compressed cork-foam article.

The resiliency and flexibility of the resulting article is dependent upon such features as the polyurethane resin employed (whether flexible or rigid); the amount of resin to the amount of cork employed; the size, amount and/or the resiliency of the foam particles; the cork particle size; the shape of the article; the molding conditions; and the like factors.

The following examples are intended to merely illustrate this invention and it is not intended that this invention shall be limited to the scope of these examples.

EXAMPLE I

A polyurethane resin is employed and produced by reacting at 80° C., with constant stirring, three (3) moles of bis(4-isocyanatophenyl)methane with one (1) mole of poly(1,4-tetramethylene oxide)diol having an average molecular weight of 1650. The resulting resin is a liquid isocyanate end-blocked (or terminated) polyurethane prepolymer.

Cork particles having a particle size of and between 20 to 40 mesh, the above polyurethane resin, fine flexible polyurethane foam particles, glycerol, and water, in the weight ratios of 5 to 5 to 3 to 1 to 3, respectively, are blended in the following manner: first the cork and foam particles are placed in a suitably sized container and blended and the specified amount of water and glycerol is added; after stirring until the water and glycerine are fully absorbed into the particles, during which time the particles appear to swell, the polyurethane resin is added and stirring is continued until the resin is fully absorbed by the particles.

The impregnated cork and foam particles are deposited by hand in a cast steel mold possessing a cavity having the shape of a shoe innersole. The bottom surface of the cavity is contoured to the shape of the bottom of a foot thereby provided with depressed areas representing an arch support and the heel puortion, and a raised area representing the support for the ball of the foot. The cavity mold is internally provided with cartridge heaters. The walls of the mold extend above the terminus of the cavity from a laterally extending surface radiating from the terminus. The amount of impregnated particles placed in the mold completely fill the cavity and the total surface of the radiating surface so that some of the particles are in contact with the extending walls. Above the mold, in a position aligned with the cavity is a movable ram, the bottom of which has a peripheral shape of the cavity's terminus and the same surface area as that of the opening to the cavity. The ram is also provided with cartridge heaters. Both the ram and cavity mold are heated to 90° C. prior to the addition of the particles.

The ram is then lowered to make direct contact with the terminus edge of the cavity, thereby forcing impregnated particles into the cavity and compressing the particles within the cavity. The ram is kept in this position for four minutes and then raised. The compressed polyurethane-impregnated cork and foam innersole is extremely resilient and flexible, the cork and foam particles are tightly interbonded, and the innersole is extremely light in weight.

The above procedure is repeated except that the ram and cavity mold are heated to 140° C. The resulting innersole is resilient, flexible and light weight. However, this innersole is less resilient and flexible than the one produced at 90° C.

EXAMPLE II

The procedure of Example I is repeated except that the liquid polyurethane resin is produced by reacting one mole of poly(ethyleneadipate) chain-terminated by hydroxyl groups (formed by reacting adipic acid with a molar excess of ethylene glycol) and having an average molecular weight of 2056, with 3.5 (three and one-half) moles of toluene diisocyanate (an isomeric mixture of 1,4- and 2,6-toluene diisocyanate) at 90° C. The resulting shoe innersole is flexible, resilient, tough and light weight.

EXAMPLE III

The polyurethane resin employed in this example is Estane 5702 (produced by B. F. Goodrich Chemical Company, Division of B. F. Goodrich Company, Cleveland, Ohio) formed by reacting poly(1,4-tetramethylenesdipate)diol, 1,4-butane diol and bis(4-isocyanatophenyl) methane, each provided in stoichiometric proportions and having the following physical properties:

| Property: | ASTM number |
|---|---|
| Specific gravity | 1.19 |
| Hardness (Shore) [1] (ASTM No. D–676) | 70A |
| Tensile strength, p.s.i. (ASTM No. D–412) | 5300 |
| 300% modulus, p.s.i. | 450 |
| Ultimate elongation, percent | 730 |
| Graves tear strength, lbs./in. (ASTM No. D–624) | 200 |
| Permanent set, percent [2] (ASTM No. D–412) | 16 |
| Abrasion resistance [2] (Taber CS–17 wheels) 5,000 cycles, 1,000 gm. load, mg. loss (ASTM No. D–1044) | 52 |
| Gehmann low[1] temperature Modulus (° C.) (ASTM No. D–1053): | |
| $T_2$ | −19 |
| $T_5$ | −24 |
| $T_{10}$ | −25 |
| $T_{100}$ | −33 |
| Freeze point | −31 |
| Brittle point (° F.)[1] (ASTM No. D–746) | ([3]) |
| Brittle temperature by impact (° F.) (ASTM No. (D–1790) | ([4]) |
| Moisture vapor transmission,[5] gms./100 in.²/24 hours (ASTM No. E–96) | 38 |

[1] Properties obtained using 75 mil sheet.
[2] Extend at 20 inches/minute to 300%, hold 10 minutes, relax 10 minutes.
[3] No break at −100° F.
[4] No failures at −80° F.
[5] 2.5 to 3.0 mil cost films.

This polyurethane elastomer is dissolved in acetone to form a 20 weight percent solution. One part by weight of cork particles having an average particle size of between 20 and 40 mesh and 0.1 part by weight of the foam particles of Example I were dispersed in 2.5 parts weight of the above solution for two hours. The particles, after absorption of solution, are placed in an air circulating oven at 80° C. for two hours, removing acetone from the particles. The particles are free-flowing and free of agglomerates.

The particles may be deposited in a 6 feet by 6 feet slot which is one-half inch thick. Both walls of the slot are 6 feet by 6 feet, 6 inches thick steel plates, one of which is stationary and the other movable toward and away from the other plate. Flushly fitted about the sides may be four (4) slidable one-half (½) inch thick steel plates, each 6 feet long and 12 inches wide, secured in aligned slots at the corners of the wall plates so that each one-half (½) inch thick plate can be slid across the space between the walls and the ends of the one-half (½) inch plates abut. The abutting ends are greased. Both wall plates may be internally fitted with electrical cartridge heaters.

One of the one-half inch slidable plates is removed when the impregnated particles are poured in the slot and the slot is filled to its top with the particles. The slot is vertically aligned on top of a vibrating table and after the first filling of the slot, the slot is vibrated to shake down the particles, after which more particles are added to completely fill the slot. Then the remaining slidable plate is slid over the opening of the slot and both wall plates are heated to 150° C. and the movable wall plate is adjusted to one-quarter (¼) inch from the other wall to make a ¼ inch thick slot. After 5 minutes, the movable walls are removed from the stationary wall by a distance of 8 inches. The compressed 6' x 6' x ¼ inch cork sheet is removed from contact with the stationary wall and may be placed in a mold having the shape of an automotive headliner. The mold may comprise matching male-female surfaces and internally may be provided to take steam. The compressed cork-foam sheet is placed in the mold and the mold is closed to ¼ inch spacing between the matching surfaces thereby shaping the sheet to the configuration of the mold. After heating the mold to 150° C., the sheet is so shaped for four (4) minutes.

The resulting headliner will be tough, self-supporting, heat-resistant, light and absorb sound.

A portion of one surface of the above headliner may be coated with a polyvinyl chloride plastisol and the plasisol firmly bonded to the surface without prior sizing of the surface.

EXAMPLE IV

The procedure of Example I is repeated except that the proportionate amounts of the constituents are by weight 5 parts cork particles, 5 parts foam particles, 5 parts liquid polyurethane resin and 5 parts glycerine and water mixed. The resulting molded material is slightly more resilient than that of Example I.

Films of plasticized poly(vinyl chloride) or copolymers of vinyl chloride and other vinyl compounds (such as vinyl acetate, vinyl alcohols, alkyl (1-4 carbon atoms) acrylates, and the like) or plastisols thereof may be bonded to the aforementioned molded articles by applying an adhesive to either the article or the film and contacting the two. Particularly suitable adhesives include the aforementioned polyurethane resins, acrylate copolymers such as a copolymer of acrylic acid, methyl acrylate and n-butyl acrylate, copolymers of vinyl chloride, vinyl acetate and vinyl alcohol, and the like.

In making the impregnated cork-foam articles of this invention, it may be found desirable to incorporate different additives to the polyurethane resin to assist or modify the type of resin formation. For example, one may add a surfactant such as a block polymer of a polyalkyleneoxide and an organopolysiloxane, e.g., a silicone surfactant serving as a dispersant to improve foaming properties. Moreover, there can be added one of a wide choice of polyurethane foam catalysts, such as the catalysts mentioned above, or heat and light stabilizers to preclude premature yellowing and/or depolymerization of the polyurethane. The latter should be added as a matter of course to all of the polyurethane resins if yellowing is considered objectionable.

The polyurethane resins may be pigmented or dyed with conventional pigments and dyes, or filled with the conventional fillers. However, it is desirable that the pigments and fillers possess and average particle size of less than about one micron.

If it is desired, the shaped articles of this invention may be adhesively bonded to another layer of material, such as fabric (woven, knitted and non-woven) wood, metal, paper, plastics and the like. This can be achieved by pressing the layer of material into the shaped article and employing sufficient heat to soften the polyurethane resin. In many cases, the layer will be securely bonded to the article with only heat and pressure. Another and preferred technique involves placing the layer of material in contact with the impregnated cork-foam particles when the particles are deposited in the mold cavity and then pressing the layer into the particles during the molding (or shaping) operation. The polyurethane resin is an excellent adhesive when employed in this manner. However, if it is undesirable to employ these techniques, then one can coat an adhesive on one or both of the surfaces of the layer and article which intercontact and, with little pressure, bond the two together in the conventional manner.

Suitable adhesives include nitrocellulose lacquers, polyacrylates such as a copolymer of ethylacrylate, vinyl acetate and acrylic acid, epoxy resins, polyurethane resins, animal glues, water glass, polyvinylchloride-vinyl acetate copolymers, synthetic and natural rubber latexes and solutions, and the like.

Though the above description of this invention relates to many specific details, it is not intended that such details should act to limit this invention except to the extent provided in the claims.

We claim:
1. A molding composition suitable for forming shaped articles comprising a free-flowing particulate granular mixture of cork and resilient open cell foam particles into which is absorbed water, glycerol and a member selected from the group consisting of:
   (a) a solution of a polyurethane elastomeric resin,
   (b) a liquid polyurethane prepolymer possessing free polyisocyanate groups,
   (c) a liquid mixture of an organic polyisocyanate and an active hydrogen containing organic compound, said liquid mixture being reactible to form a polyurethane elastomeric resin, and
   (d) mixtures thereof, said cork particles having an average particle size between about 2.5 mesh and 325 mesh, the foam particles being of a material chemically bondable with said member and comprising from 10 to 150% of the weight of the cork particles and the weight of the members comprising from 10 to 150% of the weight of the cork and foam particles said foam particles having an average particle size between 1 to 50 times the average particle size of the cork particles.

2. The molding composition of claim 1 wherein said member possesses free isocyanate groups.

3. The composition of claim 2 wherein there is additionally impregnated a chain-extender in the particles said chain-extender being an organic compound possessing alcoholic hydroxyl groups.

4. A shoe innersole obtained by the heat compression of the composition of claim 1.

5. A shaped article obtained by the heat compression of the composition of claim 1.

6. The shaped article of claim 5 wherein a surface of said article is adhesively bonded to a different material.

7. The shaped article of claim 6 wherein the material is selected from the group consisting of fabric, wood, metal, and paper.

References Cited

UNITED STATES PATENTS

| 2,365,508 | 12/1944 | Austin. | |
| 2,892,216 | 9/1959 | Steel. | |
| 3,114,722 | 12/1963 | Einhoen et al. | |
| 3,300,421 | 1/1967 | Merriman et al. | 260—2.5 |
| 3,401,128 | 9/1968 | Terry | 260—2.5 |

FOREIGN PATENTS

| 1,092,987 | 11/1967 | Great Britain. |
| 1,495,301 | 10/1967 | France. |

OTHER REFERENCES

Saunders et al.: Polyurethanes: Chem. & Tech. Part II, 1964, pp. 164–166, Interscience Publisher.

DONALD E. CZAJA, Primary Examiner

F. E. McKELVEY, Assistant Examiner

U.S. Cl. X.R.

36—43, 44; 117—100, 138.8, 161, 165; 161—89, 160, 162, 190, 211, 213, 266; 260—2.5, 9, 37, 40; 264—122, 244